United States Patent
Kwon et al.

(10) Patent No.: US 9,045,024 B2
(45) Date of Patent: Jun. 2, 2015

(54) LOWER RAIL STRUCTURE OF SLIDING DOOR FOR VEHICLE

(71) Applicant: Kia Motors Corporation, Seoul (KR)

(72) Inventors: O Sung Kwon, Anyang-si (KR); Sung Won Kim, Gwangmyeong-si (KR)

(73) Assignee: KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 13/901,382

(22) Filed: May 23, 2013

(65) Prior Publication Data
US 2014/0232132 A1 Aug. 21, 2014

(30) Foreign Application Priority Data
Feb. 15, 2013 (KR) .................... 10-2013-0016168

(51) Int. Cl.
*B60J 5/06* (2006.01)
(52) U.S. Cl.
CPC .......................................... *B60J 5/06* (2013.01)
(58) Field of Classification Search
CPC .................................. B60J 5/06; B62D 25/025
USPC .................................................. 296/155, 209
See application file for complete search history.

(56) References Cited

FOREIGN PATENT DOCUMENTS

| EP | 0 938 992 A2 | 9/1999 |
|---|---|---|
| JP | H07-119349 A | 5/1995 |
| JP | 2009-167764 A | 7/2009 |
| KR | 20-1998-023935 U | 7/1998 |
| KR | 10-1998-0054894 A | 9/1998 |
| KR | 10-2007-0041101 A | 4/2007 |
| KR | 10-2008-0054614 A | 6/2008 |

*Primary Examiner* — Dennis H Pedder
(74) *Attorney, Agent, or Firm* — McDermott Will & Emery LLP

(57) ABSTRACT

A lower rail structure of a sliding door for a vehicle fixed to a side sill inner upper panel and slidably supporting a lower roller mounted on a door includes a central support part by which the lower roller is slidably supported; an upper support part extended from one side of the central support part and coupled to one side of the side sill inner upper panel; and a lower support part extended from the other side of the central support part and coupled to the other side of the side sill inner upper panel.

3 Claims, 4 Drawing Sheets

LOWER RAIL STRUCTURE OF SLIDING DOOR FOR VEHICLE

CROSS-REFERENCE TO RELATED APPLICATION

This application is based on and claims priority from Korean Patent Application No. 10-2013-0016168, filed on Feb. 15, 2013 in the Korean Intellectual Property Office, the disclosure of which is incorporated herein in its entirety by reference.

BACKGROUND

1. Field

The present disclosure relates to a lower rail structure of a sliding door for a vehicle, and more particularly, to a lower rail structure of a sliding door for a vehicle capable of increasing support rigidity of a lower rail.

2. Background

Generally, a sliding structure for a vehicle has a structure in which it is opened or closed by installing rails at an upper portion, a central portion, and a lower portion of a body and sliding upper, central, and lower rollers installed on a door on the rails, respectively.

A conventional lower rail structure of a sliding door for a vehicle is configured to include an upper rail 20 provided in a side sill 10, a lower rail 30 provided over the upper rail 20, and a side sill lower upper panel 40 having the lower rail 30 fixed thereto, as shown in FIG. 1, wherein one end of the side sill lower upper panel 40 fixed to the side sill 10 in a cantilever form and one side of an upper portion thereof is fixed to a floor panel 50.

In addition, the upper rail 20 and the lower rail 30 are provided with an upper roller 61 and a lower roller 62 mounted on a door 60 and slidably formed, respectively. Therefore, the door 60 is opened or closed while being slid along the upper rail 20 and the lower rail 30.

However, in the lower rail structure of a sliding door for a vehicle according to the prior art, when a passenger getting in a second row of the vehicle steps on the side sill lower upper panel 40, a vertical load is generated at the side sill lower upper panel 40 due to a load of the passenger, such that the side sill lower upper panel 40 is deformed. In addition, the lower rail 30 is deformed due to the deformation of the side sill lower upper panel 40, such that a sliding property of the lower roller 62 is deteriorated. Therefore, the door is not smoothly opened or closed.

SUMMARY

Accordingly, the present disclosure has been made to solve the above-mentioned problems while advantages achieved are maintained intact.

One advantage to be achieved by the present disclosure is to provide a lower rail structure of a sliding door for a vehicle capable of increasing support rigidity of a side sill lower upper panel to which a lower rail is fixed to prevent deformation of the side sill lower upper panel and induce stable sliding of a lower roller.

In one aspect of the present disclosure, there is provided a lower rail structure of a sliding door for a vehicle fixed to a side sill inner upper panel and slidably supporting a lower roller mounted on a door, including: a central support part configured to slidably support the lower roller; an upper support part extended from a first side of the central support part and coupled to a first side of the side sill inner upper panel; and a lower support part extended from a second side of the central support part and coupled to a second side of the side sill inner upper panel.

The upper support part may extend from the central support part in a "L" shape and be coupled to the first side of the side sill inner upper panel to form a closed cross section between the upper support part and the side sill inner upper panel.

The lower support part may extend from the central support part in a "⊐" shape and be coupled to the second side of the side sill inner upper panel to form a closed cross section between the lower support part and the side sill inner upper panel.

A horizontal surface of the lower support part connected to the central support part may be formed as an inclined surface.

The lower support part may be coupled to an upper rail together with the second side of the side sill inner upper panel.

An edge of the lower rail may form a curved line.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
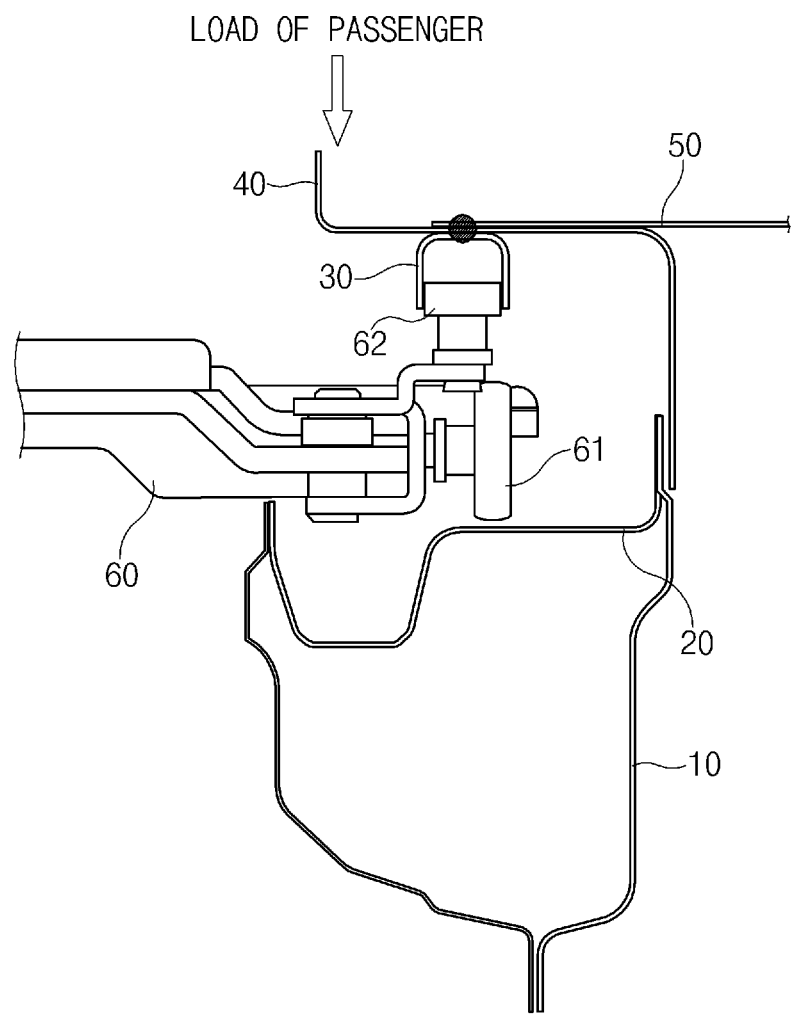
FIG. 1 is a view showing a conventional lower rail structure of a sliding door for a vehicle.

A lower rail structure of a sliding door for a vehicle according to an exemplary embodiment of the present disclosure has a configuration in which both end portions of a lower rail are welded and coupled to a side sill inner upper panel, to increase support rigidity of the lower rail, such that deformation due to a vertical load transferred to the lower rail is prevented, thereby inducing smooth opening or closing of a door.

Hereinafter, exemplary embodiments of the present disclosure will be described in detail with reference to the accompanying drawings so that they can be practiced by those skilled in the art to which the present disclosure pertains. However, the present disclosure may be implemented in various different forms and is not limited to the embodiments provided in the present description. In the accompanying drawings, portions unrelated to the description will be omitted in order to describe the present disclosure, and similar reference numerals will be used to describe similar portions throughout the present specification.

Figure 2:
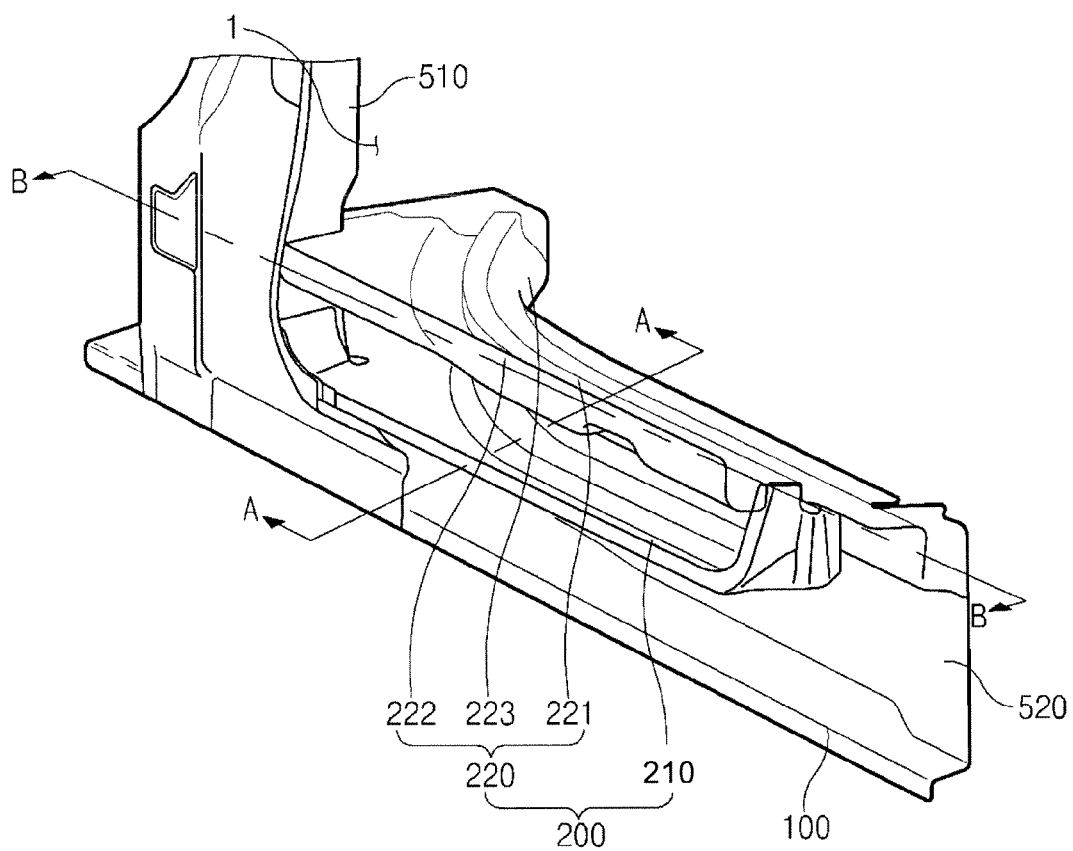
FIG. 2 is a perspective view showing a lower rail structure of a sliding door for a vehicle according to an exemplary embodiment of the present disclosure.
Figure 3:
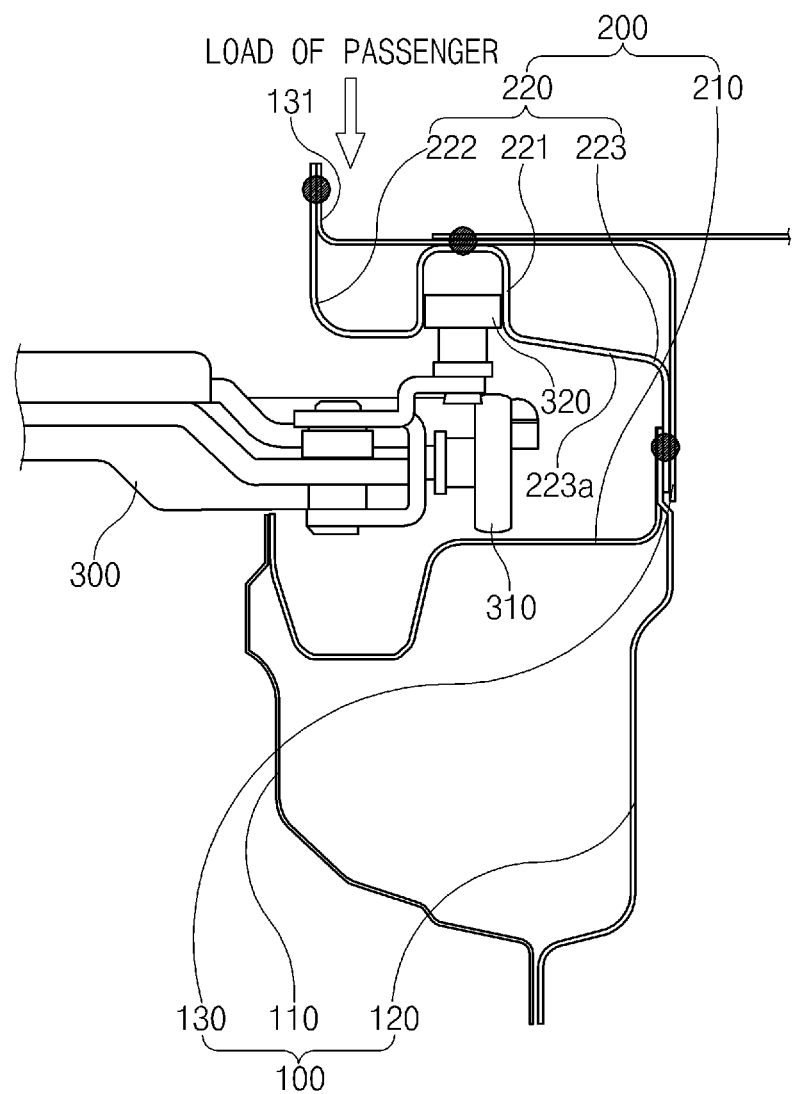
FIG. 3 is a cross-sectional view taken along the line A-A of FIG. 2.

A lower rail structure of a sliding door for a vehicle according to an exemplary embodiment of the present disclosure is configured to include a side sill 100 and a rail part 200 including an upper rail 210 and a lower rail 220 provided at an upper portion and a lower portion in the side sill 100, respectively, as shown in FIGS. 2 and 3. The upper rail 210 and the lower rail 220 have an upper roller 310 and a lower roller 320 mounted on the door 300 and slidably supported thereby, respectively. Therefore, the door 300 is opened or closed while being slid along the rail part 200.

The side sill 100 includes a side sill outer panel 110 and a side sill inner lower panel 120 that are provided to correspond to each other, and a side sill inner upper panel 130 welded and coupled to an upper portion of the side sill inner lower panel 120 and having a "⌐" shape.

A front end of the side sill inner upper panel 130 may be bent to form a bent part 131, which increases rigidity of the front panel of the side sill inner upper panel 130.

Figure 4:
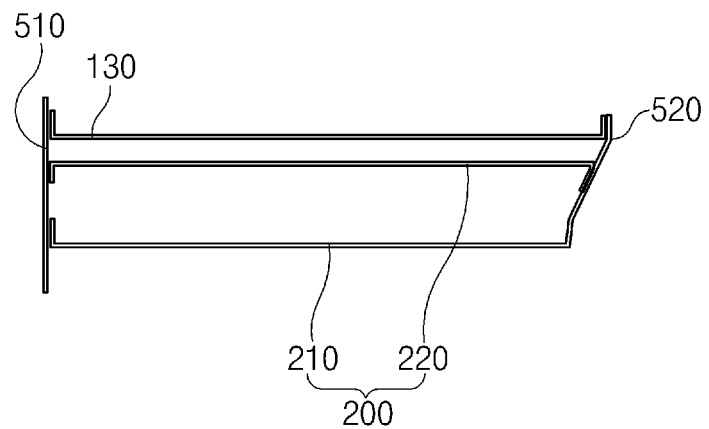
FIG. 4 is a cross-sectional view taken along the line B-B of FIG. 2.

The rail part 200 may include an upper rail 210 coupled between the side sill outer panel 110 and the side sill inner lower panel 120, and a lower rail 220 disposed over the upper rail 210 and coupled to the side sill inner upper panel 130. Both distal ends of the upper rail 210 and the lower rail 220 are coupled to filler parts 510 and 520 provided at both sides of an entrance 1 formed in a vehicle body, as shown in FIG. 4.

Here, the upper rail 210, which supports the upper roller 310 mounted on the door 300, may have both end portions welded and coupled to upper ends of the side sill outer panel 110 and the side sill inner lower panel 120. Therefore, rigidity is increased due to fixing of both sides of the upper rail 210 to rigidly support a load of the door supported by the upper rail 210.

The lower rail 220, which supports the lower roller 320 mounted on the door 300, may include a central support part 221 which slidably supports the lower roller 320, an upper support part 222 extended from one, or first, side of the central support part 221 and welded and coupled to one, or first, side of the side sill inner upper panel 130, and a lower support part 223 extended from the other, or second, side of the central support part 221 and welded and coupled to the other, or second, side of the side sill inner upper panel 130.

That is, the upper support part 222 and the lower support part 223, which are both end portions of the lower rail 220, may be welded and coupled to one side and the other side of the side sill inner upper panel 130, respectively, to increase support rigidity of the lower rail 220. Therefore, even though a vertical load generated at the side sill inner upper panel is transferred to the lower rail 220, the vertical load is dispersed to the upper support part 222 and the lower support part 223 of the lower rail 220, such that it is absorbed and deformation is suppressed.

In one embodiment, the upper support part 222 may be extended upwardly from the central support part 221 in a "L" shape and then welded and coupled to the bent part 131 of one side of the side sill inner upper panel 130. Therefore, a closed cross section may be formed between the upper support part 222 and the side sill inner upper panel 130 to increase the support rigidity.

In addition, the lower support part 223 may be extended downwardly from the central support part 221 in a "⌐" shape and then welded and coupled to the other side of the side sill inner upper panel 130. Therefore, a closed cross section may be formed between the lower support part 223 and the side sill inner upper panel 130 to increase the support rigidity.

As described above, the closed cross sections may be formed at both end portions of the lower rail 220 to more rigidly support a load generated at the lower rail 220, thereby making it possible to significantly prevent the deformation of the lower rail 220.

In an exemplary embodiment, a horizontal surface of the lower support part 223 connected to the other side of the central support part 221 may be formed as an inclined surface 223a which is gradually inclined downwardly from the central support part 221 toward the side sill inner upper panel 130.

That is, the inclined surface 223a increases a support range and buffering force of the lower rail 220 by an inclined angle to increase the support rigidity of the lower rail.

The lower support part 223 of the lower rail 220 may be welded and coupled to the other side of the upper rail 210 together with the side sill inner upper panel 130 to disperse a load transferred to the lower support part 223 to the side sill inner upper panel 130 and the upper rail 210, thereby increasing the support rigidity.

An edge of the lower rail 220 may be formed as a curved line so as not to be a right angle. Therefore, the load generated at the lower rail 220 is not concentrated on any one edge, but is uniformly dispersed to the curved line of the lower rail 220, thereby significantly preventing the deformation of the lower rail 220.

Therefore, in the lower rail structure of a sliding door for a vehicle according to an exemplary embodiment of the present disclosure, both end portions of the lower rail are welded and coupled to increase the support rigidity. As a result, the deformation due to the load generated in the lower rail is prevented, thereby making it possible to stably and smoothly open or close the door.

According to another exemplary embodiment of the present disclosure, both end portions of the lower rail are welded and coupled to the side sill inner upper panel to increase the support rigidity of the side sill inner upper panel. Therefore, the deformation of the side sill inner upper panel is significantly prevented to maintain smooth sliding of the lower roller supported by the lower rail, thereby making it possible to smoothly open or close the door.

It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A lower rail structure of a sliding door for a vehicle fixed to a side sill inner upper panel and slidably supporting a lower roller mounted on a door, comprising:
   a central support part by which the lower roller is slidably supported;
   an upper support part extended from a first side of the central support part and coupled to an upper side of the side sill inner upper panel; and
   a lower support part extended from a second side of the central support part and coupled to a lower side of the side sill inner upper panel,
   wherein the lower support part extends from the central support part in a "⌐" shape and is coupled to the lower side of the side sill inner upper panel to form a closed cross section between the lower support part and the side sill inner upper panel,
   wherein a surface of the lower support part connected to the central support part is formed as an inclined surface,
   wherein the lower support part is coupled to an upper rail together with the lower side of the side sill inner upper panel, and
   wherein the upper support part has a first bending portion bent upward therefrom and the side sill inner upper panel has a second bending portion bent upward therefrom, in which the first and second bending portions are connected to each other by welding so that separation of the connection due to a load of an occupant is prevented.

2. The lower rail structure of a sliding door for a vehicle according to claim 1, wherein the upper support part extends from the central support part in a "L" shape and is coupled to the upper side of the side sill inner upper panel to form a closed cross section between the upper support part and the side sill inner upper panel.

3. The lower rail structure of a sliding door for a vehicle according to claim 1, wherein an edge of a lower rail forms a curved line.

* * * * *